(12) United States Patent
Nishi et al.

(10) Patent No.: US 9,388,009 B2
(45) Date of Patent: Jul. 12, 2016

(54) SLIDING MEMBER FOR SHEET-SHAPED RECORDING MATERIAL DETACHMENT, SEAL RING FOR AUTOMOBILE, AND SEAL RING AND SLIDING MEMBER FOR INDUSTRIAL GAS COMPRESSOR

(75) Inventors: Eiichi Nishi, Tokyo (JP); Takashi Sato, Tokyo (JP); Hiroyoshi Uejima, Shiga (JP); Tomokazu Ichikawa, Shiga (JP); Toru Hashimoto, Aichi (JP); Shinya Kikutani, Shiga (JP); Kazuhiro Mizutani, Shiga (JP); Ryo Hisano, Ehime (JP)

(73) Assignees: ASAHI GLASS CO., LTD., Tokyo (JP); STARLITE CO., LTD., Osaka-Shi (JP)

( * ) Notice: Subject to any disclaimer, the term of this patent is extended or adjusted under 35 U.S.C. 154(b) by 0 days.

(21) Appl. No.: 13/989,520

(22) PCT Filed: Nov. 10, 2011

(86) PCT No.: PCT/JP2011/075997
§ 371 (c)(1),
(2), (4) Date: Aug. 12, 2013

(87) PCT Pub. No.: WO2012/070401
PCT Pub. Date: May 31, 2012

(65) Prior Publication Data
US 2013/0313774 A1    Nov. 28, 2013

(30) Foreign Application Priority Data

Nov. 24, 2010  (JP) .................................. 2010-261695
Nov. 24, 2010  (JP) .................................. 2010-261696

(51) Int. Cl.
*G03G 15/20*  (2006.01)
*B65H 29/56*  (2006.01)
(Continued)

(52) U.S. Cl.
CPC ................ *B65H 29/56* (2013.01); *C08L 27/12* (2013.01); *C08L 27/18* (2013.01); *C08L 79/08* (2013.01);
(Continued)

(58) Field of Classification Search
CPC ........ B65H 29/54; B65H 29/56; G03G 15/20; C08L 27/12; C08L 27/18; C08L 79/08; C08L 3/0008
USPC .......... 271/307, 308, 311–313, 900; 399/323; 524/514, 520, 495; 525/420.5
See application file for complete search history.

(56) References Cited

U.S. PATENT DOCUMENTS 5,098,627 A * 3/1992 Yoshikawa et al. ........... 264/235
5,364,670 A * 11/1994 Satoji et al. .................... 399/398
(Continued)

FOREIGN PATENT DOCUMENTS

JP         8-16815 B2    2/1996
JP         2902320 B2    6/1999
(Continued)

*Primary Examiner* — Luis A Gonzalez
(74) *Attorney, Agent, or Firm* — Westerman, Hattori, Daniels & Adrian, LLP (57) ABSTRACT

An objective of the present invention is to provide a sliding member for sheet-shaped recording material detachment having superior resistance to abrasion and superior heat resistant rigidity, and either a seal ring for an automobile or a seal ring or a sliding member for an industrial gas compressor, having high mechanical strength while ensuring flexibility. The objective is achieved with a sliding member for sheet-shaped recording material detachment, and either a seal ring for an automobile or a seal ring or a sliding member for an industrial gas compressor, made from a resin composite comprising: as a first element, either an adhesive fluorocarbon resin (A) or a resin compound of the resin (A) and a fluorocarbon resin (B) which differs from the resin (A), which are in a volumetric ratio (AB) of 5/95 to 99/1; and as a second element, 0.5 to 99 volume % of a thermoplastic polyimide (C).

37 Claims, 2 Drawing Sheets

(51) Int. Cl.
*C08L 27/12* (2006.01)
*C08L 79/08* (2006.01)
*C08L 27/18* (2006.01)
*G03G 15/00* (2006.01)
*F16J 9/26* (2006.01)

(52) U.S. Cl.
CPC ............... *F16J 9/26* (2013.01); *G03G 15/2028* (2013.01); *G03G 15/657* (2013.01); *B65H 2401/115* (2013.01); *C08L 2205/02* (2013.01); *C08L 2205/03* (2013.01)

(56) References Cited

U.S. PATENT DOCUMENTS

| | | | | |
|---|---|---|---|---|
| 5,401,574 A | * | 3/1995 | Masutani et al. | 428/338 |
| 5,466,737 A | * | 11/1995 | Oki et al. | 524/495 |
| 5,518,781 A | * | 5/1996 | Nakamura et al. | 524/497 |
| 5,726,232 A | * | 3/1998 | Egami et al. | 524/414 |
| 5,837,366 A | * | 11/1998 | Tanaka | 428/327 |
| 5,997,965 A | * | 12/1999 | Shimazu et al. | 428/1.32 |
| 6,225,399 B1 | * | 5/2001 | Araki et al. | 524/544 |
| 6,479,578 B2 | * | 11/2002 | Araki et al. | 524/517 |
| 6,509,422 B1 | * | 1/2003 | Nagashima et al. | 525/422 |
| 6,605,660 B2 | * | 8/2003 | Nakamura et al. | 524/432 |
| 6,844,051 B1 | * | 1/2005 | George et al. | 428/192 |
| 2001/0029284 A1 | * | 10/2001 | Nagashima et al. | 525/178 |
| 2006/0233992 A1 | * | 10/2006 | Funaki et al. | 428/36.91 |

FOREIGN PATENT DOCUMENTS

| | | |
|---|---|---|
| JP | 11-209548 A | 8/1999 |
| JP | 2003-3960 A | 1/2003 |
| JP | 2003-241557 A | 8/2003 |
| JP | 2006-321224 A | 11/2006 |
| JP | 2007-192242 A | 8/2007 |
| WO | 2006/064969 A1 | 6/2006 |

* cited by examiner

SLIDING MEMBER FOR SHEET-SHAPED RECORDING MATERIAL DETACHMENT, SEAL RING FOR AUTOMOBILE, AND SEAL RING AND SLIDING MEMBER FOR INDUSTRIAL GAS COMPRESSOR

TECHNICAL FIELD

The present invention relates to a sliding member for sheet-shaped recording material detachment, a seal ring for an automobile, and a seal ring and a sliding member for an industrial gas compressor.

BACKGROUND ART

Heretofore, this kind of a sliding member or a seal ring has been used in various kinds of technical fields.

Particularly, the sliding member for sheet-shaped recording material detachment has been used as a separation claw, a separation plate, and the like which detach a sheet-shaped recording material, such as a copying paper and a printing paper, from a roll of a fixing roll or the like in a fixing portion and a development portion of various kinds of image forming devices (hereinafter referred to as a "copying machine") by an electrophotographic system, such as a copying machine, a laser beam printer, and a printing machine, for example.

As functions of such a separation claw and a separation plate and the like, non-adhesive property which prevents the adhesion of printing toner, shape stability which prevents deformation and breakage of the tip portion of a separation claw and the like, and non-attackability which prevents damages to the roll surface which the most distal end portion thereof contacts, and further, particularly in a separation claw and the like contacting a high-temperature fixing roll, heat resistance which prevents the deformation thereof at a high temperature of about 200 to 250° C. and silent properties during sliding with a roll, and the like are required.

In order to satisfy the above-described demand for the performance as the sliding member for sheet-shaped recording material detachment, such as the separation claw and the separation plate, various proposals have been made. For example, mentioned are a separation claw for a copying machine (Patent Document 1) whose surface non-adhesive property is improved by forming a coat containing a specific fluorocarbon resin, such as tetrafluoroethylene, as the main component on the surface of a molded body of polyimide having a specific structure, a separation claw for copying (Patent Document 2) which is obtained by forming a melt coat of fluorine resin on the surface of a molded body of a resin composite in which a specific proportion of a reinforcing material, such as titanium oxide whiskers or zinc oxide whiskers, is compounded in a polyether ketone resin, a separation claw for copying (Patent Document 3) which is injection molded with a fluorine resin, and the like.

However, in the case of the separation claw and the like in which the melt coat of a fluorine resin is formed on the surface of the heat-resistant resin (hereinafter also referred to as a base material) as described in Patent Documents 1 and 2, one satisfying the above-described demand is obtained. However, there is a problem such that there is a necessity of using an expensive resin, such as polyimide and polyether ketone with high heat resistance, from the viewpoint in a manufacturing process for forming the melt coat of fluorine resin.

Moreover, there are problems such that since the coat is formed on the surface of a molded body of polyimide or the like, by melting a fluorine resin at a high temperature of about 300° C., a coating process has been additionally required and since the energy for heating at a high temperature has been required, additional cost has been required, and the process is not desirable also from the viewpoint of the environmental load.

Furthermore, since the surface hardness of resin, such as polyimide, is generally high, even when a coat is formed on the surface with a fluorine resin, the surface hardness is still high, which causes a risk of damaging the roll surface where the most distal end portion thereof contacts. In addition thereto, when the coat is worn out or the coat is detached due to a certain situation, there arises a problem of considerably damaging the roll surface. Moreover, since the hardness of the surface of the coat is high, silent properties are not so good.

In addition thereto, in a separation claw obtained by forming a coat on the surface of a base material, the quality of the formed coat has influence on the performance of the separation claw. However, the coat forming process is the final process but the process is most likely to cause defects, so that inspection by human beings is required. Therefore, there is a problem such that cost is required for the management aspect of performing the inspection.

In the case of the separation claw for copying which is injection molded with a fluorine resin as described in Patent Document 3, expensive resin, such as polyimide, is not used and a coat is not formed on the surface. Therefore, the separation claw is improved in terms of the cost and the environmental load as compared with the separation claw for copying described in Patent Documents 1 and 2. However, in the case of the separation claw for copying which is injection molded with a fluorine resin, there are problems such that abrasiveness is high and also the rigidity at a high temperature is low.

A seal ring and other sliding members other than the sliding member for sheet-shaped recording material detachment are used for a portion where liquid and gas are required to be sealed or a sliding portion in transport machines, such as automobiles, office machines, a gas compressor, other industrial machines, and the like. For example, a seal ring for use in various pistons for an industrial gas compressor and an automobile and the like are also sliding members. Therefore, the seal ring is required to have low abrasiveness of the seal ring itself and low attackability to a mating member of the seal ring. Furthermore, since the seal ring is also required to have sufficient sealing properties with which the seal ring hardly causes gas leakage, moderate flexibility is required.

However, for example, in an industrial gas compressor, a seal ring for use therein has been increasingly required to also have high mechanical strength with an increase in pressure of compressed gas and an increase in performance of the machine in recent years. Therefore, a currently-used polytetrafluoroethylene (PTFE) resin material containing a filler is limited in the mechanical strength (e.g., tensile strength and bending strength) and cannot meet the demand in some cases.

Thus, in order to satisfy such a request for an increase in pressure, a piston ring and the like in which a material charged with carbon fibers, PTFE, and the like is used for super engineering plastics with high mechanical strength, such as thermoplastic polyimide (TPI) and polyetheretherketone (PEEK) resin, (hereinafter also referred to as "super engineering plastics") have been proposed (for example, Patent Document 4). However, even when such a material is used, the flexibility is poor, the seal performance is not stable, leakage of gas and the like frequently occurs in the seal ring to be obtained, and the required properties are not obtained.

In order to address the problems, it is said to require a material having high mechanical strength which allows the material to bear high pressure (for example, bending strength (30 MPa or more)) and flexibility which allows the material to satisfy a seal function (for example, bending elastic modulus of 1000 MPa or more and lower than 2000 MPa and bending breaking strain of 4% or more or bending elastic modulus of 2000 MPa or more and lower than 4000 MPa and bending breaking strain of 2% or more).

As a technique for achieving both high strength and flexibility, a method is mentioned which includes mixing a plastic material with higher flexibility with super engineering plastics with high mechanical strength, such as TPI, for alloying. Under the present circumstances, the material having moderate mechanical strength and flexibility described above is not always obtained. For example, even when fluorine resin to be used as a material of a sliding member is employed as the plastic material with high flexibility described above, both the materials do not interact with each other and the materials are simply mixed (which is different from a so-called alloy) and the mixture usually becomes a material which is characterized only by weakness, so that the material is not suitable for practical use. Moreover, depending on the type or the addition amount of resin, the mechanical strength sharply decreases in some cases.

As another method, a piston seal structure has been proposed in which a functional portion having an outer circumferential surface portion constituted by a low friction material, such as PTFE, PI, PEEK, is provided in a piston of a specific structure and one-side gap with the inner circumferential surface portion of a cylinder facing the outer circumferential surface portion is set to 0.03 mm or lower (Patent Document 5). However, under the present circumstances, the piston seal structure cannot sufficiently meet the increase in pressure.

CITATION LIST

Patent Literatures

Patent Document 1: JP-B No. 1108-16815
Patent Document 2: Japanese Patent No. 2902320
Patent Document 3: JP-A No. 2003-241557
Patent Document 4: JP-A No. 2007-192242
Patent Document 5: JP-A No. 2003-3960

SUMMARY OF INVENTION

Technical Problem

In view of the above-described problems, it is an object of the present invention to provide a sliding member for sheet-shaped recording material detachment which has the above-described functions demanded as sliding members for sheet-shaped recording material detachment, such as a separation claw and a separation plate, and in which the resistance to abrasion and the heat resistantrigidity are improved without forming a coat.

It is another object to provide a seal ring for an automobile or a seal ring or a sliding member for an industrial gas compressor, containing a resin composite having high mechanical strength which allows the seal rings and the sliding member to bear high pressure (for example, bending strength (30 MPa or more)), flexibility which allows the seal rings and the sliding member to satisfy a seal function (for example, bending elastic modulus of 1000 MPa or more and lower than 2000 MPa and bending breaking strain of 4% or more or bending elastic modulus of 2000 MPa or more and lower than 4000 MPa and bending breaking strain of 2% or more).

Solution to Problem

The present inventors have extensively examined in order to solve the above-described problems. As a result, the present inventors have found that the above-described problems can be solved by the use of an adhesive fluorocarbon resin and thermoplastic polyimide, and thus the present invention has accomplished.

More specifically, the summary of the invention is as follows.

(1) A sliding member for sheet-shaped recording material detachment, a seal ring for an automobile, or a seal ring or a sliding member for an industrial gas compressor is made from a resin composite containing, as a first element, either an adhesive fluorocarbon resin (A) or a resin compound of the resin (A) and a fluorocarbon resin (B) which differs from the resin (A), which are in a volumetric ratio (A/B) of 5/95 to 99/1 and, as a second element, 0.5 to 99 volume % of a thermoplastic polyimide (C).

(2) The sliding member for sheet-shaped recording material detachment, the seal ring for an automobile, or the seal ring or the sliding member for an industrial gas compressor according to (1) above, in which the resin composite contains an additive in a proportion of 50 volume % or lower.

(3) The sliding member for sheet-shaped recording material detachment, the seal ring for an automobile, or the seal ring or the sliding member for an industrial gas compressor according to (2) above, in which the total of the volumetric ratio of each of the resin (A) or the resin compound, the thermoplastic polyimide (C), and the additive is 100 volume %.

(4) The sliding member for sheet-shaped recording material detachment, the seal ring for an automobile, or the seal ring or the sliding member for an industrial gas compressor according to any one of (1) to (3) above, in which the adhesive fluorocarbon resin (A) contains at least one functional group selected from the group consisting of an acid anhydride group, a carboxy group, an acid halide group, and a carbonate group.

(5) The sliding member for sheet-shaped recording material detachment, the seal ring for an automobile, or the seal ring or the sliding member for an industrial gas compressor according to any one of (1) to (4) above, in which the adhesive fluorocarbon resin (A) is a fluorine containing copolymer containing a first repeating unit based on tetrafluoroethylene, a second repeating unit based on a cyclic hydrocarbon monomer having a dicarboxylic anhydride group and a polymerizable unsaturated group in the ring, and a third repeating unit based on another monomer, and the first repeating unit is 50 to 99.89 mol %, the second repeating unit is 0.01 to 5 mol %, and the third repeating unit is 0.1 to 49.99 mol % based on the total molar amount of the first repeating unit, the second repeating unit, and the third repeating unit.

(6) The sliding member for sheet-shaped recording material detachment according to any one of (1) to (5) above, in which the adhesive fluorocarbon resin (A) and the fluorocarbon resin (B) are injection moldable resins, and the content of the thermoplastic polyimide (C) is 0.5 to 50 volume %.

(7) The sliding member for sheet-shaped recording material detachment according to (6) above, in which the resin composite contains at least one selected from the group consisting of a fiber-like substance, a whisker-like substance, and a particle-like substance as the additive in a proportion of 0.1 to 30 volume %.

(8) The sliding member for sheet-shaped recording material detachment according to (6) or (7) above, in which the average dispersion particle diameter of the thermoplastic polyimide (C) is 10 μm or lower.

(9) The sliding member for sheet-shaped recording material detachment according to any one of (6) to (8) above, in which the water droplet contact angle of the surface is 90° or more.

(10) The seal ring for an automobile or the seal ring or the sliding member for an industrial gas compressor according to any one of (1) to (5) above, containing the thermoplastic polyimide (C) in a proportion of 1 to 99 volume %.

Advantageous Effects of Invention

The present invention can provide a sliding member for sheet-shaped recording material detachment which has non-adhesive property, shape stability, non-attackability, heat resistance, silent properties, and the like which are demanded as sliding members for sheet-shaped recording material detachment, such as a separation claw and a separation plate, and in which the resistance to abrasion and the heat resistant rigidity are improved without forming a coat.

The present invention can also provide a seal ring for an automobile, or a seal ring or a sliding member for an industrial gas compressor containing a resin composite having high mechanical strength which allows the seal rings and the sliding member to bear high pressure (for example, bending strength (30 MPa or more), flexibility which allows the seal rings and the sliding member to satisfy a seal function (for example, bending elastic modulus of 1000 MPa or more and lower than 2000 MPa and bending breaking strain of 4% or more or bending elastic modulus of 2000 MPa or more and lower than 4000 MPa and bending breaking strain of 2% or more).

DESCRIPTION OF EMBODIMENTS

A sliding member for sheet-shaped recording material detachment, a seal ring for an automobile, or a seal ring or a sliding member for an industrial gas compressor is made from a resin composite containing, as a first element, either an adhesive fluorocarbon resin (A) or a resin compound of the resin (A) and a fluorocarbon resin (B) which differs from the resin (A), which are in a volumetric ratio (A/B) of 5/95 to 99/1 and, as a second element, 0.5 to 99 volume % of a thermoplastic polyimide (C).

More specifically, in the invention, the sliding member may be constituted using the resin composite containing the resin (A) as the first element and the thermoplastic polyimide (C) as the second element or the sliding member may be constituted using a specific resin composite containing the resin compound of the resin (A) and the resin (B) in a specific volumetric ratio as the first element and the thermoplastic polyimide (C) as the second element.

In the invention, by compounding the resin (A) or a specific resin compound in the resin composite and setting the content of the thermoplastic polyimide (C) of 0.5 to 99 volume %, it is possible to provide a sliding member for sheet-shaped recording material detachment, a seal ring for an automobile, or a seal ring or a sliding member for an industrial gas compressor having excellent properties as described above. When using the resin compound according to the intended uses described above, a suitable sliding member can be obtained by adjusting the composition and the content of the thermoplastic polyimide (C) in the resin composite. In the following description, the adhesive fluorocarbon resin (A) for use in the invention is described first, and then the sliding member for sheet-shaped recording material detachment, the seal ring for an automobile, or the seal ring or the sliding member for an industrial gas compressor of the invention is described.

(a) Adhesive Fluorocarbon Resin (A)

As the adhesive fluorocarbon resin (A) (hereinafter sometimes referred to as an adhesive fluorine resin), any material can be used without particular limitation insofar as the material has compatibility with the thermoplastic polyimide (C). Herein, the "adhesive" includes having compatibility or affinity with resin including the thermoplastic polyimide (C), another resin other than the resin (A), and other materials.

As a base fluorine resin forming the adhesive fluorine resin, a fluorine resin containing a repeating unit based on tetrafluoroethylene (TFE) can be preferably used, for example. Specifically, as the base fluorine resin, for example, one selected from the group consisting of a tetrafluoroethylene-perfluoro (alkyl vinyl ether) copolymer (PFA), a tetrafluoroethylene-hexafluoro propylene copolymer (FEP), an ethylene-tetrafluoroethylene copolymer (ETFE), a chlorotrifluoroethylene (CTFE)-TFE copolymer, and the like can be preferably used alone or a blend of two or more kinds thereof can be preferably used. Particularly, PFA can be preferably used from the viewpoint of heat resistance and non-adhesive property in the case of the sliding member for sheet-shaped recording material detachment or from the viewpoint that the heat resistance is high and melt molding can be performed in the case of the seal ring for an automobile and the seal ring or the sliding member for an industrial gas compressor.

As the adhesive fluorocarbon resin (A), a fluorine resin and the like having at least one functional group selected from the group consisting of an acid anhydride group, a carboxyl group, an acid halide group and a carbonate group are mentioned, for example. Thus, the compatibility with the thermoplastic polyimide described later, for example, can be further improved. Accordingly, when alloyed with resin, such as thermoplastic polyimide, phase separation is difficult to occur. In the case of the sliding member for sheet-shaped recording material detachment, resistance to abrasion and heat resistant rigidity can be imparted as a whole. In the case of the seal ring for an automobile and the seal ring or the sliding member for an industrial gas compressor, mechanical strength can be further improved while holding flexibility as a whole.

As the acid anhydride group contained in the adhesive fluorine resin, an unsaturated carboxylic acid anhydride group can be preferably used, and a dicarboxylic anhydride group can be more preferably used. Particularly, a dicarboxylic anhydride group combined with cyclic hydrocarbon can be preferably used.

As the acid anhydride group, a repeating unit based on a cyclic hydrocarbon monomer having a polymerizable unsaturated group and a dicarboxylic anhydride group in the ring

(hereinafter referred to as a "cyclic monomer") can be preferably used. In this case, as the adhesive fluorine resin, a fluorine containing copolymer can be preferably used, for example, which has a first repeating unit based on tetrafluoroethylene, a second repeating unit based on the cyclic hydrocarbon monomer having a dicarboxylic anhydride group and a polymerizable unsaturated group in the ring, a third repeating unit based on another monomer (hereinafter referred to as an "additional monomer") other than tetrafluoroethylene and the cyclic hydrocarbon monomer.

As the adhesive fluorine resin, a fluorine containing copolymer can be preferably used in which the first repeating unit is 50 to 99.89 mol %, the second repeating unit is 0.01 to 5 mol %, and the third repeating unit is 0.1 to 49.99 mol % based on the total molar amount of the first repeating unit, the second repeating unit, and the third repeating unit. When the mol % of each of the first repeating unit, the second repeating unit, and the third repeating unit is within the ranges mentioned above, respectively, the adhesive fluorine resin is excellent in heat resistance, chemical resistance, adhesiveness, moldability, and mechanical physical properties. The adhesive fluorine resin is more preferably a fluorine containing copolymer in which the first repeating unit is 60 to 99.45 mol %, the second repeating unit is 0.05 to 3 mol %, and the third repeating unit is 0.5 to 45 mol % and most preferably a fluorine containing copolymer in which the first repeating unit is 80 to 98.9 mol %, the second repeating unit is 0.1 to 1 mol %, and the third repeating unit is 1 to 40 mol %.

The cyclic monomer forming the adhesive fluorine resin is preferably a polymerizable compound having cyclic hydrocarbon containing one or more 5-membered rings or 6-membered rings, a dicarboxylic anhydride group, and an endocyclic polymerizable unsaturated group. As the cyclic monomer, one having cyclic hydrocarbon having one or more bridged polycyclic hydrocarbons can be preferably used and particularly one having cyclic hydrocarbon containing one bridged polycyclic hydrocarbon, cyclic hydrocarbon in which two or more bridged polycyclic hydrocarbons are condensed, or cyclic hydrocarbon in which bridged polycyclic hydrocarbon and another cyclic hydrocarbon are condensed can be preferably used. As the cyclic monomer, one having an endocyclic polymerizable unsaturated group containing one or more polymerizable unsaturated groups present between the carbon atoms constituting the hydrocarbon ring can be preferably used. As the cyclic monomer, one having a dicarboxylic anhydride group (—CO—O—CO—) bonded to two carbon atoms constituting the hydrocarbon ring or bonded to two carbon atoms outside the ring can be preferably used.

Specifically, as the cyclic monomer, 5-norbornene-2,3-dicarboxylic anhydride (hereinafter referred to as "NAH"), an acid anhydride represented by the following formulae (1) to (3), and the like can be preferably used, for example, and NAH can be particularly preferably used. By the use of the cyclic monomer described above, the adhesive fluorine resin containing the repeating unit containing the cyclic monomer can be easily manufactured without using a special polymerization method.

Chemical Formula (1)

[C. 1]

Chemical Formula (2)

[C. 2]

Chemical Formula (3)

[C. 3]

As the additional monomer forming the adhesive fluorine resin, for example, one selected from the group consisting of vinyl fluoride, vinylidene fluoride (hereinafter referred to as "VdF"), chlorotrifluoroethylene (hereinafter referred to as "CTFE"), trifluoroethylene, hexafluoropropylene (hereinafter referred to as "HFP"), $CF_2=CFOR^{f1}$ which is perfluoroalkyl vinyl ether (in which $R^{f1}$ is a perfluoroalkyl group which has 1 to 10 carbon atoms and may contain an oxygen atom between carbon atoms), $CF_2=CFOR^{f2}SO_2X^1$ (in which $R^{f2}$ is a perfluoroalkylene group which has 1 to 10 carbon atoms and may contain an oxygen atom between carbon atoms and $X^1$ represents a halogen atom or a hydroxyl group), $CF_2=CFOR^{f2}CO_2X^2$ (in which $R^{f2}$ is a perfluoroalkylene group which has 1 to 10 carbon atoms and may contain an oxygen atom between carbon atoms and $X^2$ represents a hydrogen atom or an alkyl group having 1 to 3 carbon atoms), $CF_2=CF(CF_2)_pOCF=CF_2$ (in which p is 1 or 2), $CH_2=CX^3(CF_2)_qX^4$ (in which, $X^3$ and $X^4$ each independently represent a hydrogen atom or a fluorine atom and q is an integer of 2 to 10), perfluoro(2-methylene-4-methyl-1,3-dioxolane), olefin having 2 to 4 carbon atoms, such as ethylene, propylene, and isobutene, can be used alone or two or more kinds thereof can be used in combination.

Specifically, as the additional monomer, one containing one or more elements selected from the group consisting of VdF, HFP, CTFE, $CF_2=CFOR^{f1}$, $CH_2=CX^3(CF_2)_qX^4$, and ethylene can be used, for example. Preferably, one containing one or more elements selected from the group consisting of HFP, CTFE, $CF_2=CFOR^{f1}$, ethylene, and $CH_2=CX^3(CF_2)_qX^4$ can be used and HFP, CTFE, and $CF_2=CFOR^{f1}$ are particularly preferable. As the additional monomer, $CF_2=CFOR^{f1}$ is the most preferable. In this case, as $R^{f1}$, a perfluoroalkyl group having 1 to 6 carbon atoms is preferable, a perfluoroalkyl group having 2 to 4 carbon atoms is more preferable, and a perfluoropropyl group is the most preferable.

As the adhesive fluorine resin, one whose melting point is in the range of 150 to 320° C. can be preferably used, and one whose melting point is in the range of 200 to 310° C. can be particularly preferably used. The adhesive fluorine resin whose melting point is in the ranges mentioned above is particularly suitable for melting and kneading, under a high temperature, a polymer alloy with super engineering plastics having heat resistance which allows the super engineering plastics to be resistant to a temperature of 150° C. or higher, such as polyphenylene sulfide (PPS), polyimide (PI), polyetheretherketone (PEEK), a liquid crystalline polymer (LCP), and semiaromatic polyamide, and is excellent in melt moldability. The melting point of the adhesive fluorine resin can be adjusted as appropriate according to the content ratio of each repeating unit contained in the adhesive fluorine resin.

As the adhesive fluorine resin, a fluorine resin in which the first repeating unit based on TFE is 50 to 99.89 mol %, the second repeating unit is 0.01 to 5 mol %, and the third repeating unit based on CTFE is 0.1 to 49.99 mol % can also be used.

A method for manufacturing the adhesive fluorine resin is not particularly limited, and a radical polymerization method using a radical polymerization initiator is used. As the polymerization method, mass polymerization, solution polymerization using organic solvents, such as hydrocarbon fluoride, hydrocarbon chloride, fluorinated chlorinated hydrocarbon, alcohol, and hydrocarbon, suspension polymerization using an aqueous medium and, as required, a suitable organic solvent, and emulsification polymerization using an aqueous medium and a emulsifier are mentioned, and particularly the solution polymerization is preferable.

As the radical polymerization initiator, a radical polymerization initiator having a half-life of 10 hours at 0° C. to 100° C. is preferable. The temperature is more preferably 20° C. to 90° C. Mentioned as a specific example thereof are azo compounds, such as azobisisobutyronitril, non-fluorine diacylperoxide, such as isobutyrylperoxide, octanoylperoxide, benzoylperoxide, and lauroylperoxide, peroxydicarbonate, such as diisopropylperoxydicarbonate and di-n-propylperoxydicarbonate, peroxyester, such as tert-butylperoxypivalate, tert-butyl peroxyisobutyrate, and tert-butylperoxyacetate, fluorine containing diacylperoxide, such as a compound represented by $(Z(CF_2)_rCOO)_2$ (in which Z represents a hydrogen atom, a fluorine atom, or a chlorine atom and r is an integer of 1 to 10), inorganic peroxide, such as potassium persulfate, sodium persulfate, and ammonium persulfate, and the like.

In the invention, in the case where the adhesive fluorocarbon polymer (A) is the fluorine containing copolymer, it is also preferable to use a chain transfer agent in order to control the melt flow rate (MFR) of the fluorine containing copolymer. Mentioned as the chain transfer agent are alcohol, such as methanol and ethanol, chlorofluorohydrocarbon, such as 1,3-dichloro-1,1,2,2,3-pentafluoropropane and 1,1-dichloro-1-fluoroethane, and hydrocarbon, such as pentane, hexane, and cyclohexane. As the chain transfer agent for introducing an adhesive functional group into the polymer end of the fluorine containing copolymer, acetic acid, acetic acid anhydride, methyl acetate, ethylene glycol, propylene glycol, and the like are mentioned.

The polymerization conditions of the adhesive fluorine resin for use in the invention are not particularly limited. The polymerization temperature is preferably 0 to 100° C. and more preferably 20 to 90° C. The polymerization pressure is preferably 0.1 to 10 MPa and more preferably 0.5 to 3 MPa. The polymerization time is preferably 1 to 30 hours.

The adhesive fluorine resin obtained by the manufacturing method described above can be used in the form of pellets, powder, and the like according to a usual method.

(b) Sliding Member for Sheet-Shaped Recording Material Detachment

A sliding member for sheet-shaped recording material detachment is preferably made from a resin composite containing as a first element, either an adhesive fluorocarbon resin (A) or a resin compound of the resin (A) and a fluorocarbon resin (B) which differs from the resin (A), which are in a volumetric ratio (A/B) of 5/95 to 99/1 and, as a second element, 0.5 to 50 volume % of a thermoplastic polyimide (C).

Thus, the sliding member for sheet-shaped recording material detachment according to the invention contains the thermoplastic polyimide (C) in a specific proportion, and therefore has excellent heat resistance and high mechanical strength (i.e., having shape stability and heat resistance) based on the characteristics thereof and also contains the resin (A) (the resin (B) as required), and therefore has excellent chemical resistance (i.e., non-adhesive property) and moderate flexibility (i.e., silent properties) based on the characteristics of the fluorocarbon resin. Moreover, since not only the surface but the entire member contains the resin composite described above unlike a former melt coat, the attackability to a roll can be suppressed.

As described in detail in (a) above, since the adhesive fluorocarbon resin (A) for use in the invention has properties of the fluorocarbon resin, such as moderate flexibility, excellent heat resistance, chemical resistance, weatherability, and gas barrier properties, and also has moderately high surface free energy, the adhesive fluorocarbon resin (A) can form a resin composite, such as a polymer alloy combined with other materials. Accordingly, the resin composite having excellent properties of the thermoplastic polyimide, such as heat resistance and mechanical strength, and the above-described excellent properties of the fluorocarbon resin is obtained as in the invention.

The fluorocarbon resin (B) is not particularly limited insofar as it is a fluorocarbon resin other than the adhesive fluorocarbon resin (A). Known injection moldable fluorocarbon resin can be used, e.g., one selected from the group consisting of PFA, FEP, ETFE, CTFE-TFE copolymers, and the like can be used alone or a blend of two or more kinds thereof can be used.

In the resin compound, the volumetric ratio (A/B) of the resin (A) and the fluorocarbon resin (B) which differs from the resin (A) is 5/95 to 99/1, preferably 15/85 to 90/10, and more preferably 20/80 to 85/15. Thus, the compatibility with the thermoplastic polyimide (C) is obtained. When the volumetric ratio (A/B) is smaller than 5/95, there is a tendency such that a desired compatibility is not obtained.

The volumetric ratio of the resin compound is calculated from the mass ratio and the specific gravity of each element.

For the resin (A) and the resin (B) constituting the sliding member for sheet-shaped recording material detachment, an injection moldable one is preferably used. Thus, molded products having various forms, such as a separation claw and a separation plate, can be easily manufactured. In the invention, "injection moldable" means that the melt flow rate (MFR) of the resin is 0.2 to 4.0 mm³/second.

A method for manufacturing the resin compound is not particularly limited, and methods used for the mixing of common resin, e.g., biaxial kneading, dry blend of powder, and the like, can be employed.

The thermoplastic polyimide (C) is not particularly limited and a known one and a commercially-available one can be used. As the commercially-available one, AURUM PD-500 manufactured by Mitsui Chemicals, Inc., and the like are mentioned, for example.

As described above, in the sliding member for sheet-shaped recording material detachment according to the invention, it is preferable for the resin composite to contain the thermoplastic polyimide (C) in a proportion of 0.5 to 50 volume %. Thus, the heat resistant rigidity and the resistance to abrasion are improved. When the content of the thermoplastic polyimide (C) is smaller than 0.5 volume %, there is a tendency such that an improvement of the heat resistant rigidity and the resistance to abrasion is not achieved. When the content thereof is larger than 50 volume %, there is a tendency such that the fluidity during injection molding and the surface properties deteriorate and the non-adhesive property also decreases. When using additives described below, the content may be 0.5 to 30 volume % considering the securing of fluidity during injection molding, heat resistant rigidity, and resistance to abrasion.

In the resin composite, it is preferable that the average dispersion particle diameter of the thermoplastic polyimide (C) is 10 μm or lower. In this case, a sliding member for sheet-shaped recording material detachment is obtained in which the thermoplastic polyimide (C) is moderately dispersed in the resin (A) or the resin compound and the resistance to abrasion and the heat resistant rigidity are improved.

The average dispersion particle diameter can be measured with a scanning electron microscope.

The sliding member for sheet-shaped recording material detachment according to the invention may be constituted so that the resin composite contains at least one (hereinafter referred to as a specific additive) selected from the group consisting of a fiber-like substance, a whisker-like substance, and a particle-like substance as additives. Thus, the heat resistant rigidity and the resistance to abrasion are improved. The substances can be selected as appropriate considering the reinforcement effect, the resistance to abrasion, and the fluidity during injection molding.

As the fiber-like substance, inorganic and organic fiber-like substances are mentioned. As the inorganic fiber-like substances, carbon fibers, glass fibers, graphite fibers, and metal fibers, such as stainless steel fibers, and the like are mentioned, for example. As the organic fiber-like substances, various kinds of synthetic fibers and natural fibers are mentioned. Among the above, the carbon fibers and the organic fibers are preferable from the viewpoint of resistance to abrasion and non-attackability.

The whisker-like substance is a needle-like (whisker-like) single crystalline body or polycrystalline body. As the size of the crystal body, the average diameter is 0.01 to 10 μm. As such a whisker-like substance, inorganic and organic whisker-like substances can be used. Mentioned as the inorganic whisker-like substances are, for example, a calcium silicate whisker, a calcium carbonate whisker, a calcium sulfate whisker, a magnesium sulfate whisker, a magnesium nitrate whisker, an aluminum borate whisker, a titanium oxide whisker, a zinc oxide whisker, a potassium titanate whisker, a wollastonite whisker, and the like. Among the above, the calcium carbonate whisker and the potassium titanate whisker are particularly preferable from the viewpoint of resistance to abrasion and non-attackability.

As the particle-like substances, organic and inorganic particle-like substances having a particle diameter of 0.5 to 100 μm can be used. As the inorganic particle-like substances, talc, mica, montmorillonite, silica, calcium carbonate, and the like are mentioned, for example. As the organic particle-like substances, aramid powder of wholly aromatic polyamide and the like are mentioned, for example. Among the above, talc and calcium carbonate are preferable from the viewpoint of resistance to abrasion, non-attackability, and cost.

In the sliding member for sheet-shaped recording material detachment according to the invention, the content of the additives (specific additives) in the resin composite is preferably 0.1 to 30 volume % and more preferably 3 to 20 volume % from the viewpoint of heat resistant rigidity, resistance to abrasion, and fluidity during injection molding.

In the sliding member for sheet-shaped recording material detachment according to the invention, additives other than the specific additives may be used for the resin composite in the range where the effects of the sliding member for sheet-shaped recording material detachment according to the invention are not impaired. Mentioned as such additives are one or more additives of a mold release agent, a lubricant, a heat stabilizer, an antioxidant, an ultraviolet absorber, a crystal nucleus agent, a foaming agent, an antirust, an ion trap agent, a fire retardant, an auxiliary fire retardant, a colorant, such a dye and a pigment, an antistatic agent, and the like.

The sliding member for sheet-shaped recording material detachment according to the invention may be constituted so that, in the resin composite, the total of the volumetric ratio of each of the resin (A) or the resin compound, the thermoplastic polyimide (C), and the specific additive is 100 volume %.

In the sliding member for sheet-shaped recording material detachment according to the invention, the water droplet contact angle of the surface is preferably 90° or more. In this case, particularly, the non-adhesive property of toner to the sliding member for sheet-shaped recording material detachment is further improved.

A method for manufacturing the resin composite for use in the sliding member for sheet-shaped recording material detachment according to the invention is not particularly limited and methods used for the mixing of common resin, e.g., biaxial kneading, dry blend of powder, and the like, can be employed. As the final form of the resin composite, the resin composite can be formed into a general resin form, such as pellet, strand, powder, paste, and the like.

The sliding member for sheet-shaped recording material detachment according to the invention can be obtained by integrally molding the entire resin composite by injection molding or the like. Accordingly, a process for forming a melt coat is not required, so that a simplification of a manufacturing process and a reduction of the environmental load can be achieved as compared with a former one in which a melt coat is formed. Since the injection molding can be performed, there is an advantage in that mass productivity is excellent.

The sliding member for sheet-shaped recording material detachment containing the resin composite described above can be suitably used as sliding members, such as a separation claw and a separation plate which detach a sheet-shaped recording material, such as a copying paper and a printing paper, from a roll of a fixing roll or the like in a fixing portion and a development portion of a copying machine, for example.

As an embodiment of the sliding member for sheet-shaped recording material detachment according to the invention, a case where the sliding member is a separation claw for a copying machine is described.

Figure 1:
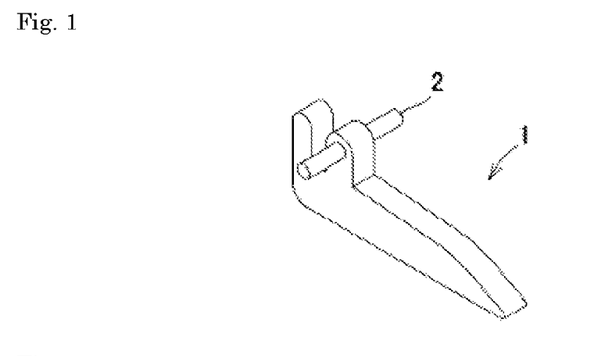
FIG. 1 is a perspective view illustrating an example of an embodiment of a sliding member for sheet-shaped recording material detachment of the invention.
Figure 2:
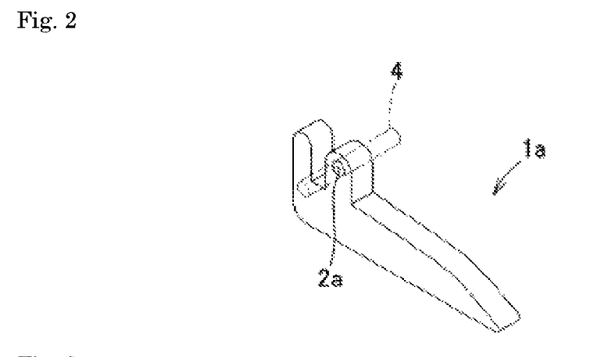
FIG. 2 is a perspective view illustrating another example of the embodiment of the sliding member for sheet-shaped recording material detachment of the invention.
Figure 3:
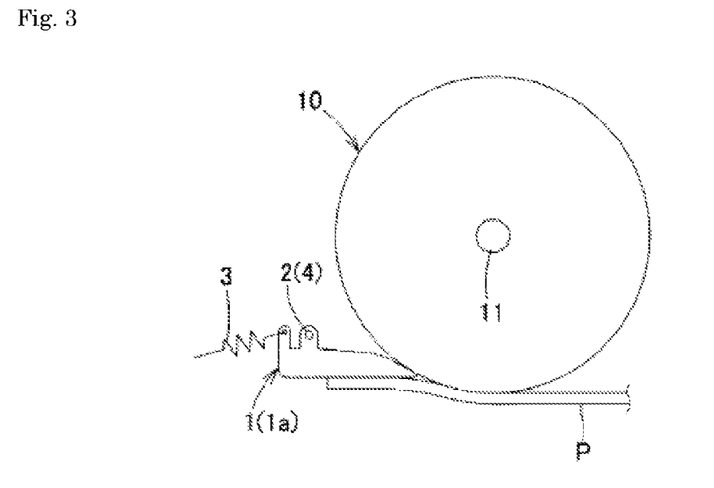
FIG. 3 is a view for describing a state where an example of the embodiment of the sliding member for sheet-shaped recording material detachment of the invention is attached to a copying machine.

In the sliding member for sheet-shaped recording material detachment according to the invention, the form of the separation claw for a copying machine is not particularly limited and may basically have the same form as that of a former separation claw. The entire separation claw for a copying machine of this embodiment is integrally molded with the resin composite. For example, as illustrated in FIG. 1, a support shaft 2 is integrally molded with a separation claw 1. Or, as illustrated in FIG. 2, for example, a shaft hole 2a is provided in a separation claw 1a. As illustrated in FIG. 3, the separation claw 1 can be rotated around the support shaft 2 by providing a rotation axis 11 of a fixing roll or another roll 10 and the support shaft 2 in such a manner as to be parallel to each other and the separation claw 1a can be rotated around an attachment shaft 4 by inserting the shaft hole 2a portion into the attachment shaft 4 provided in parallel with the rotation axis 11 of the roll 10, and then the separation claw 1 or 1a is attached in a state where the tip portion of the claws contacts the surface of the roll 10 at a proper pressure by a biasing means 3, such as a spring.

Figure 4:
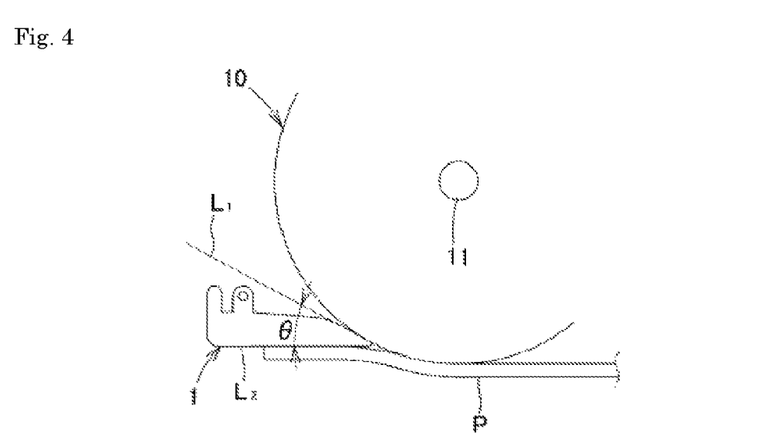
FIG. 4 is a view for describing the tip angle of a separation claw which is an example of the embodiment of the sliding member for sheet-shaped recording material detachment of the invention.

As illustrated in FIG. 4, for example, in a state where the roll 10 and the separation claw 1 are brought into contact with each other in a common use state, the angle θ formed by an edge line L1 of the separation claw 1 at the side contacting the roll 10 and an edge line L2 of the separation claw 1 through which a copying paper P passes when viewed from the rotation axis 11 side of the roll 10 is defined as the tip angle of the separation claw. The tip angle of the separation claw is preferably in the range of 5 to 80° and more preferably in the range of 25 to 45°. When the tip angle is 5° or lower, a gap is formed by bending deformation between the roll and the tip portion of the separation claw depending on the pressing force to the roll, so that paper jam of a copying paper is likely to occur during the passing of the paper. On the other hand, when the tip angle is 80° or more, the bending deformation is difficult to occur but the separation function of the copying paper is hard to be demonstrated.

(c) Seal Ring for Automobile or Seal Ring or Sliding Member for Industrial Gas Compressor A seal ring for an automobile or a seal ring or a sliding member for an industrial gas compressor according to the invention is preferably made from a resin composite containing, as a first element, either an adhesive fluorocarbon resin (A) or a resin compound of the resin (A) and a fluorocarbon resin (B) which differs from the resin (A), which are in a volumetric ratio (A/B) of 5/95 to 99/1 and, as a second element, 1 to 99 volume % of a thermoplastic polyimide (C).

Thus, by the use of the adhesive fluorocarbon resin (A) or the resin compound and the thermoplastic polyimide (C), a resin composite having moderate mechanical strength and flexibility is obtained. The resin composite is suitable as a constituent material of the seal ring for an automobile and the seal ring or the sliding member for an industrial gas compressor.

As described in detail in (a) above, the adhesive fluorocarbon resin for use in the seal ring for an automobile and the seal ring or the sliding member for an industrial gas compressor of the invention have moderate flexibility and mechanical strength and also have excellent properties of the fluorocarbon resin, such as excellent heat resistance, chemical resistance, weatherability, and gas barrier properties, and have moderately high surface free energy. Therefore, when combined with other materials, the adhesive fluorocarbon resin can form an alloyed resin composite. Accordingly, as an alloyed resin composite obtained by mixing the thermoplastic polyimide described later and the adhesive fluorocarbon resin, a resin composite is obtained which has both excellent properties of the thermoplastic polyimide, such as heat resistance and mechanical strength, and the excellent properties of the fluorocarbon resin.

The fluorocarbon resin (B) for use in the seal ring for an automobile and the seal ring or the sliding member for an industrial gas compressor of the invention is not particularly limited if it is a fluorocarbon resin other than the adhesive fluorocarbon resin (A) described above. A known fluorocarbon resin can be used, e.g., one selected from the group containing of PFA, FEP, ETFE, CTFE-TFE copolymers, and the like, for example, can be used alone or a blend of two or more kinds thereof can be used.

In the resin compound for use in the seal ring for an automobile and the seal ring or the sliding member for an industrial gas compressor of the invention, the volumetric ratio (A/B) of the resin (A) and the fluorocarbon resin (B) which differs from the resin (A) is 5/95 to 99/1. The lower limit of the volumetric ratio (A/B) is more preferably 10/90 and still more preferably 50/50. Thus, moderate flexibility and mechanical strength are obtained and also the compatibility with the thermoplastic polyimide (C) described later is obtained. When the volumetric ratio (A/B) is smaller than 5/95, there is a tendency such that moderate flexibility and the like and desired compatibility are not obtained.

The volumetric ratio of the resin compound is calculated from the mass ratio and the specific gravity of each element.

A method for manufacturing the resin compound is not particularly limited and methods used for the mixing of common resin, e.g., biaxial kneading, dry blend of powder, and the like, can be employed.

The thermoplastic polyimide (C) is not particularly limited and a known one and a commercially-available one can be used. As the commercially-available one, AURUM PD-500 manufactured by Mitsui Chemicals, Inc., and the like are mentioned, for example.

The resin composite for use in the seal ring for an automobile and the seal ring or the sliding member for an industrial gas compressor of the invention contains the thermoplastic polyimide (C) in a proportion of 1 to 99 volume %. From the viewpoint of further maintaining flexibility, the upper limit of the content is preferably 90 volume % and more preferably 80 volume %. From the viewpoint of improving the mechanical strength, the lower limit of the content is more preferably 20 volume %, still more preferably 40 volume %, and most preferably 60 volume %.

In the invention, the resin composite may also contain additives in a proportion of 50 volume % or lower. This makes it possible to achieve more preferable flexibility and mechanical strength. Such additives are not particularly limited and a filler for use in a generally-used resin can be used. For example, carbon fibers, glass fibers, graphite fibers, and metal fibers, such as stainless steel fibers, synthetic fibers, such as aramid fibers, various kinds of whiskers, graphite, molybdenum disulfide, and the like are mentioned. It is also possible to use the specific additives described in "(b) Sliding member for sheet-shaped recording material detachment" above.

In the seal ring for an automobile and the seal ring or the sliding member for an industrial gas compressor of the invention, additives other than the filler may be used for the resin composite in the range where the effects of the invention are not impaired. Mentioned as such additives are one or more additives of a mold release agent, a lubricant, a heat stabilizer, an antioxidant, an ultraviolet absorber, a crystal nucleus agent, a foaming agent, an antirust, an ion trap agent, a fire retardant, an auxiliary fire retardant, a colorant, such a dye and a pigment, an antistatic agent, and the like.

In the seal ring for an automobile and the seal ring or the sliding member for an industrial gas compressor of the invention, the additives and the like may be contained as appropriate in the resin composite. The seal ring for an automobile and the seal ring or the sliding member for an industrial gas compressor of the invention may be constituted so that the total of the volumetric ratio of each of the resin (A) or the resin compound, the thermoplastic polyimide (C), and the filler is 100 volume %. More specifically, the seal ring for an automobile and the seal ring or the sliding member for an industrial gas compressor of the invention may be constituted so that the resin composite contains the resin (A) or the resin compound and the thermoplastic polyimide (C) as the essential element and contains the filler which is an arbitrary element (The volumetric ratio of the filler is sometimes 0.) but does not contain other elements. By constituting the same as described above, the resistance to abrasion can be increased and the mechanical strength can be increased without losing the moderate flexibility and low friction properties of the resin (A), so that a more preferable aspect as the seal ring for an automobile and the seal ring or the sliding member for an industrial gas compressor, for example, can be achieved.

As a method for manufacturing the resin composite for use in the seal ring for an automobile and the seal ring or the sliding member for an industrial gas compressor of the invention, when mixing the resin (A) or the resin compound and the thermoplastic polyimide (C) and the filler, the method is not particularly limited insofar as the substances can be uniformly mixed. Methods used for the mixing of common resin, e.g., biaxial kneading, dry blend of powder, and the like, can be employed. As the final form of the resin composite, the resin composite can be formed into a general resin form, such as pellet, strand, powder, paste, and the like according to a usual method The seal ring for an automobile and the seal ring or the sliding member for an industrial gas compressor according to the invention can be obtained by molding the resin composite by injection molding, transfer molding, compression molding (hot molding method, free baking method, and the like), and other general molding methods.

In the invention, the "seal ring" refers to parts for sealing gas, liquid, solid, powder, and the like, such as a piston ring for use in automobiles (for example, a compressor of a car air-conditioner and the like) and an industrial gas compressor. The "sliding member" refers to parts which move (slide) at low friction while receiving the load of a piston, a piston rod, and the like in the vicinity of a piston ring of an industrial gas compressor. A case where the seal ring is used as the sliding parts and a case where the sliding parts are used as the seal ring are included in the category of the invention.

The seal ring and the sliding member molded as described above have high mechanical strength and moderate flexibility. More specifically, as the index of the mechanical strength, the bending strength is 30 MPa or more. As the index of the flexibility, the bending elastic modulus is 1000 MPa or more and lower than 2000 MPa and the bending breaking strain is 4% or more or the bending elastic modulus is 2000 MPa or more and lower than 4000 MPa and the bending breaking strain is 2% or more.

Since the seal ring for an automobile and the seal ring or the sliding member for an industrial gas compressor of the invention have high mechanical strength and moderate flexibility as described above, the seal ring for an automobile and the seal ring or the sliding member for an industrial gas compressor of the invention can be suitably used as parts for sealing media, such as gas and liquid, and parts for use in a sliding portion and are more suitably used as a seal ring of a sliding portion.

As a specific example of the seal ring for an automobile or an industrial gas compressor, a piston ring, a rod packing, a grand packing, and the like are mentioned. As a specific example of the sliding member for an industrial gas compressor, a rider ring, a bearing, and the like are mentioned. However, the invention is not limited thereto.

Among the seal ring for an automobile and the seal ring or the sliding member for an industrial gas compressor of the invention, the invention is particularly suitable as a seal ring which also has a function as a sliding member for an industrial gas compressor which requires further airtightness.

EXAMPLES

Manufacturing Example

Manufacturing of Adhesive Fluorocarbon Resin (A)

An adhesive fluorocarbon resin (A) (an adhesive fluorine resin) was manufactured using NAH(HIMIC Anhydride manufactured by Hitachi Chemical Co., Ltd.) as a monomer having an acid anhydride group and $CF_2$=$CFO(CF_2)_3F$ (perfluoropropylvinylether manufactured by Asahi Glass Co., Ltd.) (hereinafter referred to as PPVE) as an additional monomer.

First, 369 kg of 1,3-dichloro-1,1,2,2,3-pentafluoropropane (AK225cb manufactured by Asahi Glass Co., Ltd.) (hereinafter referred to as "AK225cb") and 30 kg of PPVE were charged in a polymerization vessel with a stirrer having an internal volume of 430 L which was degassed beforehand. Subsequently, the inside of the polymerization vessel was heated to 50° C., 50 kg of TFE was further charged therein, and then the pressure in the polymerization vessel was increased to 0.89 MPa/G.

Furthermore, a solution in which (perfluorobutyryl) peroxide was dissolved in AK225cb with a concentration of 0.36 mass % was prepared as a polymerization initiator solution. Then, polymerization was performed while continuously adding 3 L of the solution into the polymerization vessel at a rate of 6.25 mL per minute. TFE was continuously charged so that the pressure in the polymerization vessel during the polymerization reaction was held at 0.89 MPa/G. A solution in which NAH was dissolved in AK225cb with a concentration of 0.3 mass % was continuously charged with an amount equivalent to 0.1 mol % in terms of the number of moles of TFE which was charged during the polymerization.

8 hours after the polymerization was started, when 32 kg of TFE was charged, the temperature in the polymerization vessel was reduced to room temperature and also the vessel was purged to normal pressure. After the obtained slurry was subjected to solid liquid separation from AK225cb, followed by drying at 150° C. for 15 hours, 33 kg of an adhesive fluorine resin was obtained. The specific gravity of the obtained adhesive fluorine resin was 2.15.

From the results of the melt NMR analysis and the infrared absorption spectrum analysis, as the copolymerization composition of the adhesive fluorine resin (sometimes abbreviated as m-PFA), the ratio of the repeating unit (the first repeating unit) based on TFE, the repeating unit based on NAH (the second repeating unit), and the repeating unit based on PPVE (third repeating unit) was 97.9/0.1/2.0 (mol %). The melting point of the adhesive fluorine resin (m-PFA) was 300° C. and the melt flow rate (MFR) was 0.39 mm$^3$/second. Therefore, the obtained m-PFA was able to be injection molded.

Examples 1 to 8, Comparative Examples 1 and 2

Sliding Member for Sheet-Shaped Recording Material Detachment

Resin composites of the compositions based on volume shown in Table 1 (Table 2 shows the compositions based on mass.) were prepared by a biaxial kneading extruder according to a usual method using the injection moldable m-PFA produced in the manufacturing example as an adhesive fluorocarbon resin (A), PFA manufactured by Asahi Glass Co., Ltd., (Product name: "Fluon (Registered Trademark) PFA P-62XP", Specific gravity ($\rho$): 2.15) as an injection moldable fluorocarbon resin (B), TPI manufactured by Mitsui Chemicals, Inc., (Product name: "AURUM (Registered Trademark) PD-500", Specific Gravity ($\rho$): 1.33) as a thermoplastic polyimide (C), and carbon fibers (Specific Gravity ($\rho$): 1.7), glass fibers (Specific Gravity ($\rho$): 2.5), and calcium carbonate whiskers (Specific Gravity ($\rho$): 2.8) as additives (specific additives), and then pellets were obtained. The obtained resin composites were injection molded according to a usual method, thereby molding sliding members for sheet-shaped recording material detachment (injection-molded products) as samples for evaluation.

Reference Example

Pellets of a resin composite of the composition shown in Table 1 (Table 2) were obtained in the same manner as in Examples and Comparative Examples. On the surface of a sliding member for sheet-shaped recording material detachment which was injection molded using the obtained resin composite, a sliding member for sheet-shaped recording material detachment on which a melt coat of PFA was formed was prepared according to a usual method.

(Evaluation of Sliding Members for Sheet-Shaped Recording Material Detachment)

The injection-molded products prepared in Examples 1 to 8, Comparative Examples 1 and 2, and Reference Example (Product after a coat was formed in Reference Example; the same applies in the following description.) were evaluated for the following items. The evaluation results are shown in Table 3.

<Appearance of Injection-Molded Products>

The surface appearance of the injection-molded products prepared in Examples and the like were visually observed. The evaluation criteria are as follows.

○: No surface detachment occurred.
×: Surface detachment occurred.

<Measurement of Average Dispersion Particle Diameter of TPI>

Using the injection-molded products prepared in Examples and Comparative Examples, the injection-molded products which were immersed in liquid nitrogen and frozen were freeze-cut, and then observed under a scanning electron microscope (SEM) (S-3400N manufactured by Hitachi High-Technologies Corp.) to thereby measure the particle diameter of TPI using a length measuring function attached to the SEM.

<Measuring of Bending Elastic Modulus at 25° C.>

A bending test at 25° C. was performed according to JIS K7203 using the injection-molded products prepared in Examples and the like.

<Measuring of Bending Elastic Modulus at 200° C.>

A bending test at 200° C. was performed according to JIS K7203 using the injection-molded products prepared in Examples and the like.

<Sliding with Stainless Steel: Measurement of Specific Abrasion Amount at 25° C.>

Using the injection-molded products prepared in Examples and the like, the specific abrasion amount at 25° C. to stainless steel was measured by a pin-on disk type friction abrasion tester under the conditions of Table 4 (The temperature of the stainless steel was 25° C.). Since the stainless steel was a general mating material for confirming a difference in the friction abrasion characteristics between materials, the stainless steel was employed.

<Sliding with Stainless Steel: Measurement of Specific Abrasion Amount at 200° C.>

Using the injection-molded products prepared in Examples and the like, the specific abrasion amount at 200° C. to stainless steel was measured by a pin-on disk type friction abrasion tester under the conditions of Table 4 (The temperature of the stainless steel was 200° C.).

<Sliding with Stainless Steel: Evaluation of Attackability to Mating Material (Non-Attackability)>

Using the injection-molded products prepared in Examples and the like, the attackability of the injection molded products to stainless steel was evaluated by a pin-on disk type friction abrasion tester under the conditions of Table 4 (The temperature of the stainless steel was 25° C.). The evaluation criteria are as follows.

○: The depth of damage of the stainless steel was 2 μm or lower.
Δ: The depth of damage of the stainless steel was larger than 2 μm and 10 μm or lower.

<Sliding with PFA: Measurement of Specific Abrasion Amount at 200° C.>

Using the injection-molded products prepared in Examples and the like, the specific abrasion amount at 200° C. to PFA was measured by a pin-on disk type friction abrasion tester under the conditions of Table 4 (The temperature of the PFA was 200° C.). Since the surface of a roll was generally covered with PFA, the PFA was employed.

<Sliding with PFA: Measurement of Abrasion Coefficient at 200° C.>

Using the injection-molded products prepared in Examples and the like, the abrasion coefficient at 200° C. to PFA was measured by a pin-on disk type friction abrasion tester under the conditions of Table 4 (The temperature of the PFA was 200° C.).

<Sliding with PFA: Evaluation of Attackability to Mating Material (Non-Attackability)>

Using the injection-molded products prepared in Examples and the like, the attackability of the injection molded products to PFA was evaluated by a pin-on disk type friction abrasion tester under the conditions of Table 4 (The temperature of the PFA was 25° C.). The evaluation criteria are as follows.

○: The depth of damage of the PFA was 30 μm or lower.
Δ: The depth of damage of the PFA was larger than 30 μm and 100 μm or lower.

<Measurement of Water Droplet Contact Angle>

The water droplet contact angle of the surface was measured using the injection-molded products prepared in Examples and the like with an automatic contact angle meter (manufactured by Kyowa Interface Science Co., Ltd., FACE automatic contact angle meter CA-Z type).

<Deformation Characteristics During Heating>

Using the injection-molded products prepared in Examples and the like, a load of 1.96 N was applied to an edge portion having a thickness of 2.5 mm, a tip angle of 45°, and a tip R of 0.05 mm on a 200° C. stainless steel disk. Then, the size in the load direction before and 2 hours after the test were measured, and then a difference in the size before and after the test (deformation amount) was calculated, thereby evaluating the deformation characteristics during heating. The evaluation criteria are as follows.

⊚: The deformation amount was lower than 0.05 mm.

○: The deformation amount was 0.05 mm or more and lower than 0.15 mm.

Δ: The deformation amount was 0.15 mm or more.

<Material Cost>

Examples 1 to 8, the comparative examples 1 and 2, and Reference Example were evaluated for the material cost. The evaluation criteria are as follows.

⊚: The material cost was equal to the kg-unit price of the injection-molding materials of PFA.

○: The material cost was lower than a price 4 times the kg-unit price of the injection-molding materials of PFA.

<Ease of Process>

Examples, Comparative Examples, and Reference Example were evaluated for the ease of the process. The evaluation criteria are as follows.

○: No coating process was provided.

Δ: Coating process was provided.

<Product Cost>

The product cost was evaluated by scoring, in the evaluation of the material cost and the ease of the process among the evaluation items, ⊚ as 2 points, ○ as 1 point, and Δ as 0 point of each of the evaluation criteria, and then defining the total of the evaluation scores of both the evaluations was 3 to 4 points as ⊚, 2 points as ○, and 0 to 1 points as Δ.

TABLE 1

| Composition [vol %] | | Examples | | | | | | | | Comparative Examples | | Reference Example |
|---|---|---|---|---|---|---|---|---|---|---|---|---|
| | | 1 | 2 | 3 | 4 | 5 | 6 | 7 | 8 | 1 | 2 | |
| Resin A | m-PFA ($\rho$: 2.15) | 90 | 80 | 70 | 40 | 65 | 20 | 83 | 82.5 | — | — | — |
| Resin B | PFA ($\rho$: 2.15) | — | — | — | 50 | 15 | 70 | — | — | 100 | 80 | — |
| Resin C | TPI ($\rho$: 1.33) | 10 | 20 | 30 | 10 | 20 | 10 | 10 | 10 | — | 20 | 80 |
| Additives | Glass fibers ($\rho$: 2.5) | — | — | — | — | — | — | — | — | — | — | 20 |
| | Carbon fibers ($\rho$: 1.7) | — | — | — | — | — | — | 7 | — | — | — | — |
| | Calcium carbonate whiskers ($\rho$: 2.8) | — | — | — | — | — | — | — | 7.5 | — | — | — |

TABLE 2

| Composition [mass %] | | Examples | | | | | | | | Comparative Examples | | Reference Example |
|---|---|---|---|---|---|---|---|---|---|---|---|---|
| | | 1 | 2 | 3 | 4 | 5 | 6 | 7 | 8 | 1 | 2 | |
| Resin A | m-PFA ($\rho$: 2.15) | 93.6 | 86.6 | 79.0 | 41.6 | 70.4 | 20.8 | 87.7 | 83.8 | — | — | — |
| Resin B | PFA ($\rho$: 2.15) | — | — | — | 52.0 | 16.2 | 72.8 | — | — | 100 | 86.6 | — |
| Resin C | TPI ($\rho$: 1.33) | 6.4 | 13.4 | 21.0 | 6.4 | 13.4 | 6.4 | 6.5 | 6.3 | — | 13.4 | 68 |
| Additives | Glass fibers ($\rho$: 2.5) | — | — | — | — | — | — | — | — | — | — | 32 |
| | Carbon fibers ($\rho$: 1.7) | — | — | — | — | — | — | 5.8 | — | — | — | — |
| | Calcium carbonate whiskers ($\rho$: 2.8) | — | — | — | — | — | — | — | 9.9 | — | — | — |

TABLE 3

| | | Examples | | | | | | | | Comparative Examples | | Reference Example |
|---|---|---|---|---|---|---|---|---|---|---|---|---|
| | | 1 | 2 | 3 | 4 | 5 | 6 | 7 | 8 | 1 | 2 | |
| Surface appearance of injection-molded product | | ○ | ○ | ○ | ○ | ○ | ○ | ○ | ○ | ○ | x | ○ |
| Average dispersion particle diameter of TPI [μm] | | ≤10 | ≤10 | ≤10 | ≤10 | ≤10 | ≤10 | ≤10 | ≤10 | — | 10< | — |
| Bending elastic modulus at 25° C. [MPa] | | 670 | 830 | 1070 | 680 | 850 | 690 | 2450 | 1070 | 570 | 860 | 8000 |
| Bending elastic modulus at 200° C. [MPa] | | 160 | 270 | 460 | 160 | 280 | 160 | 660 | 250 | 75 | 250 | 5800 |
| Sliding with stainless steel | Specific abrasion amount (25° C.) × $10^5$ [mm$^3$/N·m] | 1.4 | 1.3 | 1.3 | 1.5 | 1.4 | 1.4 | 0.5 | 2.3 | 8.9 | — | 0.43 |
| | Specific abrasion amount (200° C.) × $10^5$ [mm$^3$/N·m] | 0.43 | 0.26 | 0.19 | 0.46 | 0.23 | 0.44 | 0.76 | 3.2 | 5.7 | — | 1.2 |
| | Attackability to mating member | ○ | ○ | ○ | ○ | ○ | ○ | ○ | ○ | ○ | — | ○ |
| Sliding with PFA | Specific abrasion amount (200° C.) × $10^5$ [mm$^3$/N·m] | 0.64 | 0.93 | 1.2 | 0.59 | 0.88 | 0.62 | 0.24 | 0.73 | 7.9 | — | 0.69 |
| | Friction coefficient at 200° C. | 0.37 | 0.35 | 0.35 | 0.38 | 0.36 | 0.37 | 0.33 | 0.39 | 0.51 | — | 0.32 |
| | Attackability to mating member | ○ | ○ | ○ | ○ | ○ | ○ | ○ | ○ | ○ | — | Δ |
| Water droplet contact angle [°] | | 103 | 101 | 100 | 104 | 102 | 103 | 105 | 103 | 106 | 87~98 | 100 |
| Deformation characteristics during heating | | ○ | ○ | ○ | ○ | ○ | ○ | ○ | ○ | Δ | — | ⊚ |
| Material cost | | ○ | ○ | ○ | ○ | ○ | ○ | ○ | ○ | ⊚ | — | ○ |
| Ease of process | | ○ | ○ | ○ | ○ | ○ | ○ | ○ | ○ | ○ | — | Δ |
| Product cost | | ○ | ○ | ○ | ○ | ○ | ○ | ○ | ○ | ⊚ | — | Δ |

In Comparative Example 2, surface detachment was observed on the surface appearance of the injection-molded product and poor dispersion was observed in the SEM image in the measurement of the average dispersion particle diameter of TPI.

TABLE 4

| Shape of evaluation sample | | Columnar shape: Diameter of φ 5 mm, Height of 10 mm |
|---|---|---|
| Surface roughness of mating material | Stainless steel | Arithmetic average roughness Ra = 0.3 μm |
| | PFA | Arithmetic average roughness Ra = 1.0 μm |
| Temperature of mating material | Stainless steel | 25° C., 200° C. |
| | PFA | 200° C. |
| Surface pressure | | 0.3 MPa |
| Slipping speed | | 12 m/min |
| Test time | | 20 hours |
| Lubrication | | None |

Examples 9 to 16, Comparative Examples 3 to 9

Seal Ring for Automobile and Seal Ring or Sliding Member for Industrial Gas Compressor Samples for evaluation for evaluating the suitability as a seal ring for an automobile and a seal ring or a sliding member for an industrial gas compressor were produced using the m-PFA prepared in the manufacturing example, and the evaluation thereof was performed. Then, each evaluation system is described first, and then the preparation of each samples for evaluation used for each evaluation system is described.

(Evaluation as Seal Ring for Automobile and Seal Ring or Sliding Member for Industrial Gas Compressor)

The measurement of the average dispersion particle diameter and the measurement of physical properties (bending test) were performed using each sample for evaluation produced in Examples 9 to 16 and Comparative Examples 3 to 9 described later. The evaluation results are shown in Tables 7 and 10.

<Measurement of Average Dispersion Particle Diameter>

Each sample for measuring the dispersion particle diameter was immersed in liquid nitrogen and frozen, the samples were freeze-cut, and then the cross section thereof was observed under a scanning electron microscope (SEM) (S-3400N manufactured by Hitachi High-Technologies Corp.) to thereby measure the particle diameter of the domain using a length measuring function attached to the SEM. The average dispersion particle diameter serves as a guideline for judging the compatibility of each element contained in the resin composite. The average dispersion particle diameter is small as compared with the case where the m-PFA is not contained. The elements having a smaller average dispersion particle diameter can be judged to have good compatibility.

<Bending Test>

A bending test was performed according to JIS K7203 using each sample for evaluation for measuring the physical properties to measure the bending elastic modulus, the maximum bending strength, and the bending breaking strain.

<Conformity as Seal Ring for Automobile, Seal Ring or Sliding Member for Industrial Gas Compressor>

The conformity as the seal ring for an automobile or the seal ring or the sliding member for an industrial gas compressor was evaluated based on the results of the bending test among the evaluations. The evaluation criteria are as follows.

As the bending strength serving as an index of high mechanical strength, the maximum bending strength was employed.

One satisfying the following (i) and (ii) or (iii) was evaluated as ○ and one not satisfying any one of (i) and (ii) or (iii) was evaluated as x.

(i) The maximum bending strength was 30 MPa or more.
(ii) The bending elastic modulus was 1000 MPa or more and lower than 2000 MPa and the bending breaking strain was 4% or more.
(iii) The bending elastic modulus was 2000 MPa or more and lower than 4000 MPa and the bending breaking strain was 2% or more.

Examples 9 to 11, Comparative Examples 3 to 5

Resin composites of the compositions based on volume shown in Table 5 (Table 6 shows the compositions based on mass.) were prepared by a biaxial kneading extruder (manufactured by TECHNOVEL, KZW15TW-45MG-NH) according to a usual method using the m-PFA produced in the manufacturing example as an adhesive fluorocarbon resin (A), PFA manufactured by Asahi Glass Co., Ltd., (Product name: "Fluon (Registered Trademark) PFA P63", Specific gravity: 2.15) as a fluorocarbon resin (B), and TPI manufactured by Mitsui Chemicals, Inc., (Product name: "AURUM (Registered Trademark) PD-500", Specific Gravity: 1.33) as a thermoplastic polyimide (C), and then pellets were obtained. The obtained resin composites were compression molded according to a usual method, thereby molding the samples for evaluation for measuring the average dispersion particle diameter described above (1 mm thick sheet). The samples for evaluation for measuring the physical properties described above (approximately cylindrical shape of Outer diameter of φ60 mm×Inner diameter of φ30 mm×Length of 100 mm) were molded by transfer molding according to a usual method.

Examples 12 and 13

Resin composites of the compositions based on volume shown in Table 5 (Table 6 shows the compositions based on mass.) were prepared in the same manner as in Example 5, and then samples for evaluation for measuring the physical properties (approximately cylindrical shape of Outer diameter of φ60 mm×Inner diameter of φ30 mm×Length of 100 mm) were molded by compression molding.

Comparative Example 6

The TPI manufactured by Mitsui Chemicals, Inc. was compression molded by a hot molding method according to a usual method, thereby molding a sample for evaluation for measuring the physical properties described later (approximately cylindrical shape of Outer diameter of φ60 mm×Inner diameter of φ30 mm×Length of 100 mm).

Comparative Example 7

PTFE manufactured by Asahi Glass Co., Ltd., (Product name: "Fluon (Registered Trademark) PTFE G165", Specific gravity: 2.17) was compression molded by a free baking method according to a usual method, thereby molding a sample for evaluation for measuring the physical properties described above (approximately cylindrical shape of Outer diameter of φ60 mm×Inner diameter of φ30 mm×Length of 100 mm).

TABLE 5

| Composition [vol %] | Examples | | | | | Comparative Examples | | | | |
|---|---|---|---|---|---|---|---|---|---|---|
| | 9 | 10 | 11 | 12 | 13 | 3 | 4 | 5 | 6 | 7 |
| Resin A  m-PFA (Specific gravity: 2.15) | 25 | 50 | 75 | 2.5 | 12.5 | — | — | — | — | — |
| Resin B  PFA (Specific gravity: 2.15) | — | — | — | 22.5 | 12.5 | 25 | 50 | 75 | — | — |
| Resin C  TPI (Specific gravity: 1.33) | 75 | 50 | 25 | 75 | 75 | 75 | 50 | 25 | 100 | — |
| PTFE (Specific gravity: 2.17) | — | — | — | — | — | — | — | — | — | 100 |
| Filler  Carbon fibers (Specific gravity: 1.76) | — | — | — | — | — | — | — | — | — | — |

TABLE 6

| Composition [mass %] | Examples | | | | | Comparative Examples | | | | |
|---|---|---|---|---|---|---|---|---|---|---|
| | 9 | 10 | 11 | 12 | 13 | 3 | 4 | 5 | 6 | 7 |
| Resin A  m-PFA (Specific gravity: 2.15) | 35 | 62 | 83 | 3.5 | 17.5 | — | — | — | — | — |
| Resin B  PFA (Specific gravity: 2.15) | — | — | — | 31.5 | 17.5 | 35 | 62 | 83 | — | — |
| Resin C  TPI (Specific gravity: 1.33) | 65 | 38 | 17 | 65 | 65 | 65 | 38 | 17 | 100 | — |
| PTFE (Specific gravity: 2.17) | — | — | — | — | — | — | — | — | — | 100 |
| Filler  Carbon fibers (Specific gravity: 1.76) | — | — | — | — | — | — | — | — | — | — |

TABLE 7

| | Examples | | | | | Comparative Examples | | | | |
|---|---|---|---|---|---|---|---|---|---|---|
| | 9 | 10 | 11 | 12 | 13 | 3 | 4 | 5 | 6 | 7 |
| Average dispersion particle diameter [μm] | 10 | 15 | 7 | — | — | 20 | 30 | 20 | — | — |
| Bending elastic modulus [MPa] | 2500 | 1600 | 1000 | 2150 | 2490 | 1900 | 1300 | 900 | 4000 | 580 |
| Maximum bending strength [MPa] | 65 | 40 | 35 | 40 | 50 | 35 | 15 | 25 | 125 | — |
| Bending braking strain [%] | 3 | 4 | 9 | 2 | 2 | 2 | 1 | 8 | 2 | — |
| Evaluation for compatibility | ○ | ○ | ○ | ○ | ○ | x | x | x | x | x |

Examples 14 to 16, Comparative Example 8

Powder of each element was stirred and mixed with a mixer according to a usual method in such a manner as to achieve the compositions based on volume shown in Table 8 (Table 9 shows the compositions based on mass.). The obtained mixture was compression molded by a hot molding method, thereby molding samples for evaluation for measuring the physical properties (approximately cylindrical shape of Outer diameter of ϕ60 mm×Inner diameter of ϕ30 mm×Length of 100 mm) containing resin composites of the compositions shown in Table 8 (Table 9). As carbon fibers (CF), PAN-based middle fibers (Specific Gravity: 1.76) were used.

Comparative Example 9

Powder of each element was stirred and mixed with a mixer according to a usual method in such a manner as to achieve the compositions based on volume shown in Table 8 (Table 9 shows the compositions based on mass.). The obtained mixture was compression molded by a free baking method, thereby molding samples for evaluation for measuring the physical properties (approximately columnar shape of Outer diameter of ϕ50 mm×Length of 50 mm) containing resin composites of the compositions shown in Table 8 (Table 9).

TABLE 8

| | Examples | | | Comparative Examples | |
|---|---|---|---|---|---|
| Composition [vol %] | 14 | 15 | 16 | 8 | 9 |
| Resin A  m-PFA (Specific gravity: 2.15) | 21 | 42.5 | 64 | — | — |
| Resin B  PFA (Specific gravity: 2.15) | — | — | — | — | — |
| Resin C  TPI (Specific gravity: 1.33) | 64 | 42.5 | 21 | 70 | — |
| PTFE (Specific gravity: 2.17) | — | — | — | — | 85 |
| Filler  Carbon fibers (Specific gravity: 1.76) | 15 | 15 | 15 | 30 | 15 |

TABLE 9

| | Examples | | | Comparative Examples | |
|---|---|---|---|---|---|
| Composition [mass %] | 14 | 15 | 16 | 8 | 9 |
| Resin A  m-PFA (Specific gravity: 2.15) | 29 | 52.5 | 72 | — | — |
| Resin B  PFA (Specific gravity: 2.15) | — | — | — | — | — |
| Resin C  TPI (Specific gravity: 1.33) | 54 | 32.5 | 14 | 64 | — |
| PTFE (Specific gravity: 2.17) | — | — | — | — | 87 |
| Filler  Carbon fibers (Specific gravity: 1.76) | 17 | 15 | 14 | 36 | 13 |

TABLE 10

|  | Examples | | | Comparative Examples | |
| --- | --- | --- | --- | --- | --- |
|  | 14 | 15 | 16 | 8 | 9 |
| Bending elastic modulus [MPa] | 3800 | 2700 | 1800 | 17000 | 970 |
| Maximum bending strength [MPa] | 40 | 39 | 38 | 313 | 18 |
| Bending braking strain [%] | 2 | 3 | 7 | — | — |
| Evaluation for compatibility | ○ | ○ | ○ | x | x |

REFERENCE SIGNS LIST 1, 1a Separation claw for a copying machine
2 Support shaft
2a Shaft hole
3 Biasing means
4 Attachment shaft
10 Roll
11 Rotation axis
P Copying paper
θ Tip angle

The invention claimed is:

1. A sliding member for sheet-shaped recording material detachment comprising:
as a first element, a resin composite containing either an adhesive fluorocarbon resin (A) or a resin compound of the resin (A) and a fluorocarbon resin (B) which differs from the resin (A),
which are in a volumetric ratio (AB) of 5/95 to 99/1; and
as a second element, 0.5 to 99 volume % of a thermoplastic polyimide (C), wherein the adhesive fluorocarbon resin (A) is a fluorine containing copolymer containing a first repeating unit based on tetrafluoroethylene, a second repeating unit based on a cyclic hydrocarbon monomer having a dicarboxylic anhydride group and a polymerizable unsaturated group in a ring, and a third repeating unit based on another monomer, and the first repeating unit is 50 to 99.89 mol %, the second repeating unit is 0.01 to 5 mol %, and the third repeating unit is 0.1 to 49.99 mol % based on a total molar amount of the first repeating unit, the second repeating unit, and the third repeating unit,
the fluorine containing copolymer has compatibility with the thermoplastic polyimide (C), and
the sliding member is an injection molded article of a molten and kneaded mixture of the resin composite.

2. The sliding member for sheet-shaped recording material detachment according to claim 1, wherein the resin composite contains an additive in a proportion of 50 volume % or lower.

3. The sliding member for sheet-shaped recording material detachment according to claim 2, wherein a total of a volumetric ratio of each of the resin (A) or the resin compound, the thermoplastic polyimide (C), and the additive is 100 volume %.

4. The sliding member for sheet-shaped recording material detachment according to claim 1, wherein the adhesive fluorocarbon resin (A) contains at least one functional group selected from the group consisting of an acid anhydride group, a carboxy group, an acid halide group, and a carbonate group.

5. The sliding member for sheet-shaped recording material detachment according to claim 1, wherein
the adhesive fluorocarbon resin (A) and the fluorocarbon resin (B) are injection moldable resins, and a content of the thermoplastic polyimide (C) is 0.5 to 50 volume %.

6. The sliding member for sheet-shaped recording material detachment according to claim 5, wherein the resin composite contains at least one selected from the group consisting of a fiber-like substance, a whisker-like substance, and a particle-like substance as the additive in a proportion of 0.1 to 30 volume %.

7. The sliding member for sheet-shaped recording material detachment according to claim 5, wherein the average dispersion particle diameter of the thermoplastic polyimide (C) is 10 μm or lower.

8. The sliding member for sheet-shaped recording material detachment according to claim 5, wherein a water droplet contact angle of a surface is 90° or more.

9. The sliding member for sheet-shaped recording material detachment according to claim 1, wherein the second repeating unit is 0.1 to 1 mol % based on a total molar amount of the first repeating unit, the second repeating unit, and the third repeating unit.

10. A composite, comprising:
as a first element, a resin composite containing either an adhesive fluorocarbon resin (A) or a resin compound of the resin (A) and a fluorocarbon resin (B) which differs from the resin (A),
which are in a volumetric ratio (A/B) of 5/95 to 99/1; and
as a second element, 0.5 to 99 volume % of a thermoplastic polyimide (C),
wherein the adhesive fluorocarbon resin (A) is a fluorine containing copolymer containing a first repeating unit based on tetrafluoroethylene, a second repeating unit based on a cyclic hydrocarbon monomer having a dicarboxylic anhydride group and a polymerizable unsaturated group in a ring, and a third repeating unit based on another monomer, and the first repeating unit is 50 to 99.89 mol %, the second repeating unit is 0.01 to 5 mol %, and the third repeating unit is 0.1 to 49.99 mol % based on a total molar amount of the first repeating unit, the second repeating unit, and the third repeating unit,
the fluorine containing copolymer has compatibility with the thermoplastic polyimide (C), and
the resin composite is meltable and kneadable, and is injection moldable.

11. The composite according to claim 10, wherein the resin composite contains an additive in a proportion of 50 volume % or lower.

12. The composite according to claim 11, wherein a total of a volumetric ratio of each of the resin (A) or the resin compound, the thermoplastic polyimide (C), and the additive is 100 volume %.

13. The composite according to claim 10, wherein the adhesive fluorocarbon resin (A) contains at least one functional group selected from the group consisting of an acid anhydride group, a carboxy group, an acid halide group, and a carbonate group.

14. The composite according to claim 10, wherein
the adhesive fluorocarbon resin (A) and the fluorocarbon resin (B) are injection moldable resins, and a content of the thermoplastic polyimide (C) is 0.5 to 50 volume %.

15. The composite according to claim 14, wherein the resin composite contains at least one selected from the group consisting of a fiber-like substance, a whisker-like substance, and a particle-like substance as the additive in a proportion of 0.1 to 30 volume %.

16. The composite according to claim 14, wherein the average dispersion particle diameter of the thermoplastic polyimide (C) is 10 μm or lower.

17. The composite according to claim 14, wherein a water droplet contact angle of a surface is 90° or more.

18. The composite according to claim 10, comprising the thermoplastic polyimide (C) in a proportion of 1 to 99 volume %.

19. The composite according to claim 10, wherein the second repeating unit is 0.1 to 1 mol % based on a total molar amount of the first repeating unit, the second repeating unit, and the third repeating unit.

20. A seal ring for an automobile comprising:
as a first element, a resin composite containing either an adhesive fluorocarbon resin (A) or a resin compound of the resin (A) and a fluorocarbon resin (B) which differs from the resin (A), which are in a volumetric ratio (A/B) of 5/95 to 99/1; and
as a second element, 0.5 to 99 volume % of a thermoplastic polyimide (C),
wherein the adhesive fluorocarbon resin (A) is a fluorine containing copolymer containing a first repeating unit based on tetrafluoroethylene, a second repeating unit based on a cyclic hydrocarbon monomer having a dicarboxylic anhydride group and a polymerizable unsaturated group in a ring, and a third repeating unit based on another monomer, and the first repeating unit is 50 to 99.89 mol %, the second repeating unit is 0.01 to 5 mol %, and the third repeating unit is 0.1 to 49.99 mol % based on a total molar amount of the first repeating unit, the second repeating unit, and the third repeating unit,
the fluorine containing copolymer has compatibility with the thermoplastic polyimide (C), and
the seal ring is an injection molded article of a molten and kneaded mixture of the resin composite.

21. The seal ring for an automobile according to claim 20, wherein the resin composite contains an additive in a proportion of 50 volume % or lower.

22. The seal ring for an automobile according to claim 21, wherein a total of a volumetric ratio of each of the resin (A) or the resin compound, the thermoplastic polyimide (C), and the additive is 100 volume %.

23. The seal ring for an automobile according to claim 20, wherein the adhesive fluorocarbon resin (A) contains at least one functional group selected from the group consisting of an acid anhydride group, a carboxy group, an acid halide group, and a carbonate group.

24. The seal ring for an automobile according to claim 20, comprising the thermoplastic polyimide (C) in a proportion of 1 to 99 volume %.

25. The seal ring for an automobile according to claim 20, wherein the second repeating unit is 0.1 to 1 mol % based on a total molar amount of the first repeating unit, the second repeating unit, and the third repeating unit.

26. A seal ring for an industrial gas compressor comprising:
as a first element, a resin composite containing either an adhesive fluorocarbon resin (A) or a resin compound of the resin (A) and a fluorocarbon resin (B) which differs from the resin (A), which are in a volumetric ratio (AB) of 5/95 to 99/1; and
as a second element, 0.5 to 99 volume % of a thermoplastic polyimide (C),
wherein the adhesive fluorocarbon resin (A) is a fluorine containing copolymer containing a first repeating unit based on tetrafluoroethylene, a second repeating unit based on a cyclic hydrocarbon monomer having a dicarboxylic anhydride group and a polymerizable unsaturated group in a ring, and a third repeating unit based on another monomer, and the first repeating unit is 50 to 99.89 mol %, the second repeating unit is 0.01 to 5 mol %, and the third repeating unit is 0.1 to 49.99 mol % based on a total molar amount of the first repeating unit, the second repeating unit, and the third repeating unit,
the fluorine containing copolymer has compatibility with the thermoplastic polyimide (C), and
the seal ring is an injection molded article of a molten and kneaded mixture of the resin composite.

27. The seal ring for an industrial gas compressor according to claim 26, wherein the resin composite contains an additive in a proportion of 50 volume % or lower.

28. The seal ring for an industrial gas compressor according to claim 27, wherein a total of a volumetric ratio of each of the resin (A) or the resin compound, the thermoplastic polyimide (C), and the additive is 100 volume %.

29. The seal ring for an industrial gas compressor according to claim 26, wherein the adhesive fluorocarbon resin (A) contains at least one functional group selected from the group consisting of an acid anhydride group, a carboxy group, an acid halide group, and a carbonate group.

30. The seal ring for an industrial gas compressor according to claim 26, comprising the thermoplastic polyimide (C) in a proportion of 1 to 99 volume %.

31. The seal ring for an industrial gas compressor according to claim 26, wherein the second repeating unit is 0.1 to 1 mol % based on a total molar amount of the first repeating unit, the second repeating unit, and the third repeating unit.

32. A sliding member for an industrial gas compressor comprising:
as a first element, a resin composite containing either an adhesive fluorocarbon resin (A) or a resin compound of the resin (A) and a fluorocarbon resin (B) which differs from the resin (A), which are in a volumetric ratio (A/B) of 5/95 to 99/1; and
as a second element, 0.5 to 99 volume % of a thermoplastic polyimide (C),
wherein the adhesive fluorocarbon resin (A) is a fluorine containing copolymer containing a first repeating unit based on tetrafluoroethylene, a second repeating unit based on a cyclic hydrocarbon monomer having a dicarboxylic anhydride group and a polymerizable unsaturated group in a ring, and a third repeating unit based on another monomer, and the first repeating unit is 50 to 99.89 mol %, the second repeating unit is 0.01 to 5 mol %, and the third repeating unit is 0.1 to 49.99 mol % based on a total molar amount of the first repeating unit, the second repeating unit, and the third repeating unit,
the fluorine containing copolymer has compatibility with the thermoplastic polyimide (C), and
the sliding member is an injection molded article of a molten and kneaded mixture of the resin composite.

33. The sliding member for an industrial gas compressor according to claim 32,
wherein the resin composite contains an additive in a proportion of 50 volume % or lower.

34. The sliding member for an industrial gas compressor according to claim 33,
wherein a total of a volumetric ratio of each of the resin (A) or the resin compound, the thermoplastic polyimide (C), and the additive is 100 volume %.

35. The sliding member for an industrial gas compressor according to claim 32,
wherein the adhesive fluorocarbon resin (A) contains at least one functional group selected from the group consisting of an acid anhydride group, a carboxy group, an acid halide group, and a carbonate group.

36. The sliding member for an industrial gas compressor according to claim 32, comprising the thermoplastic polyimide (C) in a proportion of 1 to 99 volume %.

37. The sliding member for an industrial gas compressor according to claim 32, wherein the second repeating unit is 0.1 to 1 mol % based on a total molar amount of the first repeating unit, the second repeating unit, and the third repeating unit.

* * * * *